US009853914B1

(12) United States Patent
Felstaine et al.

(10) Patent No.: US 9,853,914 B1
(45) Date of Patent: Dec. 26, 2017

(54) SYSTEM, METHOD, AND COMPUTER PROGRAM FOR SELECTING AT LEAST ONE NEW PHYSICAL ELEMENT AND/OR VIRTUAL ELEMENT FOR USE IN A SYSTEM INCLUDING A NETWORK FUNCTION VIRTUALIZATION ORCHESTRATOR (NFV-O)

(71) Applicant: Amdocs Software Systems Limited, Dublin (IE)

(72) Inventors: Eyal Felstaine, Hertzeliya (IL); Itzik Kitroser, Beer Sheva (IL); Ofer Hermoni, Yavne (IL); Shmuel Ur, Shorashim (IL)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 246 days.

(21) Appl. No.: 14/538,731

(22) Filed: Nov. 11, 2014

(51) Int. Cl.
*G06F 15/173* (2006.01)
*H04L 12/911* (2013.01)
*H04L 12/26* (2006.01)

(52) U.S. Cl.
CPC ............ *H04L 47/823* (2013.01); *H04L 43/04* (2013.01)

(58) Field of Classification Search
CPC ............... G06F 9/45533; H04L 47/125; H04L 67/1008; H04L 67/22; Y02B 60/142; G06Q 10/0633; H04W 28/08; H04W 84/18; H04W 16/24; H04W 24/00; H04W 28/06; H04W 4/005; H04W 4/006; H04W 4/043; H04W 52/04
See application file for complete search history.

(56) References Cited

U.S. PATENT DOCUMENTS

| | | | | |
|---|---|---|---|---|
| 8,433,801 | B1 * | 4/2013 | Yemini | G06Q 10/06 709/226 |
| 2012/0137002 | A1 * | 5/2012 | Ferris | G06F 9/5072 709/226 |
| 2013/0268940 | A1 * | 10/2013 | Gmach | G06F 9/5077 718/104 |

(Continued)

*Primary Examiner* — Umar Cheema
*Assistant Examiner* — Anh Nguyen
(74) *Attorney, Agent, or Firm* — Zilka-Kotab, PC

(57) ABSTRACT

A system, method, and computer program product are provided for selecting at least one new physical element and/or virtual element for use in a system including a network function virtualization orchestrator (NFV-O). In use, information corresponding to data traffic associated with a network system including an NFV-O module is identified, the NFV-O module being operable to manage data flow associated with one or more Virtual Network Functions (VNFs) and one or more physical elements of the network system. Additionally, an overall expected usage of the network system is determined based on the information corresponding to the data traffic. Further a cost of implementing at least one of one or more new physical elements or one or more VNFs is determined, based on the overall expected usage. Moreover, at least one of the one or more new physical elements or the one or more VNFs to implement in the network system is selected based at least partially on the determined cost of implementing the one or more new physical elements and the cost of implementing the one or more VNFs.

14 Claims, 13 Drawing Sheets

(56) References Cited

U.S. PATENT DOCUMENTS

2016/0080482 A1* 3/2016 Gilbert ................ H04L 41/5025
709/226
2016/0212012 A1* 7/2016 Young ................ H04L 41/0816
709/221

* cited by examiner

SYSTEM, METHOD, AND COMPUTER PROGRAM FOR SELECTING AT LEAST ONE NEW PHYSICAL ELEMENT AND/OR VIRTUAL ELEMENT FOR USE IN A SYSTEM INCLUDING A NETWORK FUNCTION VIRTUALIZATION ORCHESTRATOR (NFV-O)

FIELD OF THE INVENTION

The present invention relates to telecommunications and/or data communications and, more particularly to network function virtualization (NFV) of telecommunications networks.

BACKGROUND

Network Function Virtualization is a term or a name of a proposed architecture of telecom services as published by the European Telecommunications Standards Institute (ETSI) in a series of documents available from the ETSI website. NFV uses generic hardware platform and software adapted for the generic hardware platform. Thus, NFV creates a network much more flexible and dynamic than a legacy communication network. In NFV-based networks, a Virtual Network Function (VNF) decouples the software implementation of the network function from the infrastructure resources it runs on by virtualization. A network service is based on one or more VNFs and/or Physical Network Functions (PNFs), their interconnections, and chaining definitions. The VNFs can be executed on almost any generic hardware processing facility. Therefore, VNFs may be installed, removed, and moved between hardware facilities, much more easily, less costly and thus, more frequently.

The flexibility of the NFV-based network enhances the means available for optimizing the network's capacity and performance, for example, by migrating VNFs between processing units according to the changing demands. A service provided by the communication network may be implemented using a plurality of VNFs interconnected as a group. Companies should have the option to utilize physical infrastructure, while still having the ability to take advantage of what NFV-based network enhancements have to offer.

There is thus a need for addressing these and/or other issues associated with the prior art.

SUMMARY

A system, method, and computer program product are provided for selecting at least one new physical element and/or virtual element for use in a system including a network function virtualization orchestrator (NFV-O). In use, information corresponding to data traffic associated with a network system including an NFV-O module is identified, the NFV-O module being operable to manage data flow associated with one or more Virtual Network Functions (VNFs) and one or more physical elements of the network system. Additionally, an overall expected usage of the network system is determined based on the information corresponding to the data traffic. Further a cost of implementing at least one of one or more new physical elements or one or more VNFs is determined, based on the overall expected usage. Moreover, at least one of the one or more new physical elements or the one or more VNFs to implement in the network system is selected based at least partially on the determined cost of implementing the one or more new physical elements and the cost of implementing the one or more VNFs.

DETAILED DESCRIPTION

Figure 1:
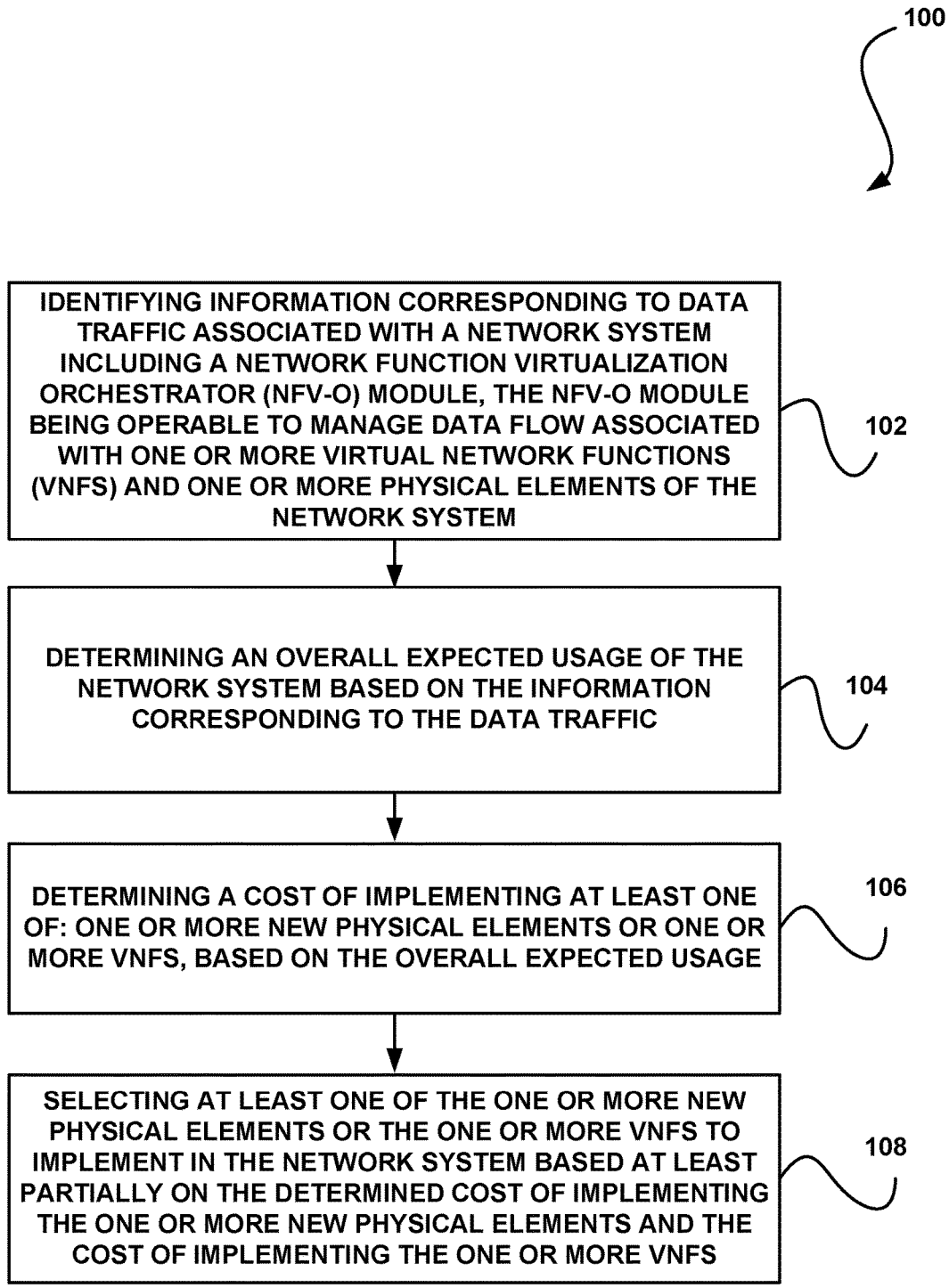
FIG. 1 illustrates a method for selecting at least one new physical element and/or virtual element for use in a system including a network function virtualization orchestrator (NFV-O), in accordance with one embodiment.

FIG. 1 illustrates a method 100 for selecting at least one new physical element and/or virtual element for use in a system including a network function virtualization orchestrator (NFV-O), in accordance with one embodiment.

As shown, information corresponding to data traffic associated with a network system including an NFV-O module is identified. See operation 102. The NFV-O module is operable to manage data flow associated with one or more Virtual Network Functions (VNFs) and one or more physical elements of the network system.

The network system may include any physical and/or virtual system and may include any number of physical/virtual elements and/or services. Moreover, the system may be associated with any type of communications system. In one embodiment, the system may include a data-center with existing infrastructure of physical elements such as compute resources (e.g., servers, etc.), storage resources, and/or network resources.

The NFV-O module may include any module capable of managing data flow associated with the VNFs and/or the physical elements of the communication network system. The NFV-O module may be operable to preserve service continuity when migrating a VNF (or a group of VNFs, or a service, etc.) between hardware units, and/or when migrating a VNF functionality (or the functionality of a group of VNFs, or a service) between different VNFs (e.g. between VNF(s) of different VNF vendors).

As shown further in FIG. 1, an overall expected usage of the network system is determined based on the information corresponding to the data traffic. See operation 104. In one embodiment, the method 100 may further include monitoring data traffic associated with the network system. In one embodiment, monitoring the data traffic associated with the network system may function to identify the information corresponding to data traffic.

In one embodiment, a usage log of the network system may be generated utilizing the information associated with the data traffic. In this case, the usage log may be utilized to determine the overall expected usage of the network system. In one embodiment, determining the expected usage may include determining an expected average usage utilizing the usage log.

In another embodiment, a usage log to associate with the data traffic may be identified. For example, the usage log may be identified from another system, etc. Further, in one embodiment, the usage log may be estimated.

Further, a cost of implementing at least one of one or more new physical elements and/or one or more VNFs is determined, based on the overall expected usage. See operation 106. The cost for the physical elements may include any cost associated with implementing the physical elements.

For example, the cost of implementing the new physical elements may include a cost to purchase the new physical elements. As another example, the cost of implementing the new physical elements may include a cost to utilize the new physical elements. As another example, the cost of implementing the new physical elements may include a cost of electricity to utilize the new physical elements. As yet another example, the cost of implementing the new physical elements may include a cost to install the new physical elements.

The cost of the VNFs may include any cost associated with implementing the VNFs. For example, the cost of implementing the VNFs may include a cost of usage of the VNFs. As another example, the cost of implementing the VNFs may include a cost of installing the VNFs. As another example, the cost of implementing the VNFs may include a cost of renting the VNFs.

Moreover, at least one of the one or more new physical elements or the one or more VNFs to implement in the network system is selected based at least partially on the determined cost of implementing the one or more new physical elements and the cost of implementing the one or more VNFs. See operation 108.

In one embodiment, selecting the new physical elements to purchase for use in the network system may include considering a use of every physical element alternative in the network system. In this case, this may include determining whether a cost of utilizing one of the physical element alternatives is less than the cost of purchasing the new physical elements.

In another embodiment, the method 100 may include selecting to implement the VNFs if it is determined that the cost of implementing the VNFs to handle the expected usage is less than the cost of implementing the new physical elements to handle the expected usage. Further, the new physical elements may be selected to purchase for use in the network system if it is determined that the cost of implementing the new physical elements is less than the cost of implementing the VNFs. Additionally, in one embodiment, the physical element may be selected to for use in the network system such that a cost of purchasing the physical element, plus a cost of using the physical element, plus a cost of virtual element usage is minimized when the physical element cannot handle the data traffic.

Thus, the method 100 details how physical and virtual services can be combined to determine what physical services to purchase to reduce cost. The expected load of a system may be determined, and the cost of using physical and/or virtual elements may be calculated such that a decision may be made as to what elements to utilize.

In the context of the present description, the terms "network" and "communication network" refer to the hardware and software connecting one or more communication elements including wireline networks, wireless networks, and/or combinations thereof.

The terms "network function virtualization" (NFV) and virtual network function (NFV) are described in a series of documents published by the European Telecommunications Standards Institute (ETSI) and available from the ETSI website. The term "virtual network function or feature" (VNF) refers to a particular implementation of a function, a feature, or a service provided by the network, internally within the network, or externally to a customer, subscriber, end-user, a terminal or a server. A VNF may include the software program implementation of the function or feature or service. The term VNF instance (VNF-I) refers to a particular process or task executing the VNF program by a particular virtual machine or processor or computing facility and/or used by a particular customer (or subscriber, end-user, terminal or server, etc.).

The term "service" refers to any type of use (such as a use case) that a NFV-based communication network may offer or provide to one or more communication elements. A service may include switching data or content between any number of elements, providing content from a server to a communication element or between servers, securing and protecting communication and content, processing content provided by the customer or by a third party, providing backup and redundancy, etc. A service may be using partial functionality of a VNF or may include one or more VNFs and/or one or more VNF instances forming a service sub-network (or interconnection model). In the context of the present description, the term "chain" may refer to such service sub-network, such as a particular plurality of VNFs and/or VNF instances associated with a particular service type or a service instance.

The term "deployment", when referring to hardware elements, including processing elements, memory elements, storage elements, connectivity (communication) elements, etc., refer to the configuration or topology of these hardware elements creating the NFV-based network. The term "deployment", when referring to software elements, such a VNFs and VNF instances, refers to the association between such software elements and hardware elements.

The term "deployment optimizations" refers to association of software and hardware elements in a manner that satisfies a particular set of requirements and/or rules, such as load-related and performance-related requirements, or a manner that makes a better use of a particular hardware deployment, such as by reducing operational cost.

The terms "service deployment optimization", or "service optimization" or "chain optimization" refer to optimizing the deployment of a service chain, i.e., optimizing the deployment of one or more VNF instances making a particular service. The terms chain optimization and service optimization may thus be used interchangeably.

The term "session" refers to a communication connection between two or more entities that persists for a period of time during which data may be exchanged there between. A session may be implemented and managed by a session layer in the corresponding network protocol. The term session may include a network session and a logical session. The network session may be associated with the devices used to communicate, while the logical session may be associated with the communicating parties (users) and may persist regardless of the communication means that the parties are using.

The term "service continuity" includes and applies to the terms "session continuity" and "streaming continuity". Streaming refers to streaming media, session or service, such as sound (including voice), video, multimedia, animation, etc. The term service usually applies to a group of VNFs (or the functionality provided by the group of VNFs) but may also apply to a single VNF (or the functionality provided by the VNF). The term "continuity" indicates that the session or the service is not interrupted, or that an interruption is short enough that a user is not aware of such interruption, or that the interruption does not cause any loss of data, or that the loss is handled in acceptable manner (e.g. a few packets of speech lost, but the conversation can continue, etc.).

The term "availability" or "service availability" refers to a level of the service, or a characteristic of the service, in which the service provider should provide the service, albeit possible hardware or software faults. For example, the service provider may obligate to the customer to provide a particular level of processing power, communication features such as bandwidth, latency, and jitter, database consistency, etc. Such level or characteristic of the service should be available to the customer even when a hardware component or a software component providing the service do not function properly. Providing availability may therefore require additional resources such as backup resources and/or mirroring. Hence "availability" may also refer to the terms "fault recovery" and "redundancy".

The term "fault recovery" refers to the process of recovering one or more of the network's services, functions, and features after a fault, whether caused by a hardware malfunction, a system crash, a software bug or a security breech or fault. A hardware malfunction includes, but is not limited to, any type of inadequate performance associated with, for example, power supply, processing units, memory, storage, transmission line, etc. The term "fault recovery" also applies to recovering the functionality of one or more VNFs or VNF instances with respect to any of the above. The terms security breech or security fault may be used interchangeably.

The term "redundancy" refers to any type of component of the network that is fully or partly duplicated, provided in standby mode, or otherwise available, to replace another component of the network when that other component stops functioning properly or otherwise indicates some kind of fault. Redundancy may apply, but is not limited to, hardware, software, data and/or content.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

The principles and operation of a system, method, and computer program product for selecting at least one new physical element and/or virtual element for use in a system including a NFV-O according to various embodiments may be further understood with reference to the following drawings and accompanying description.

Figure 2:
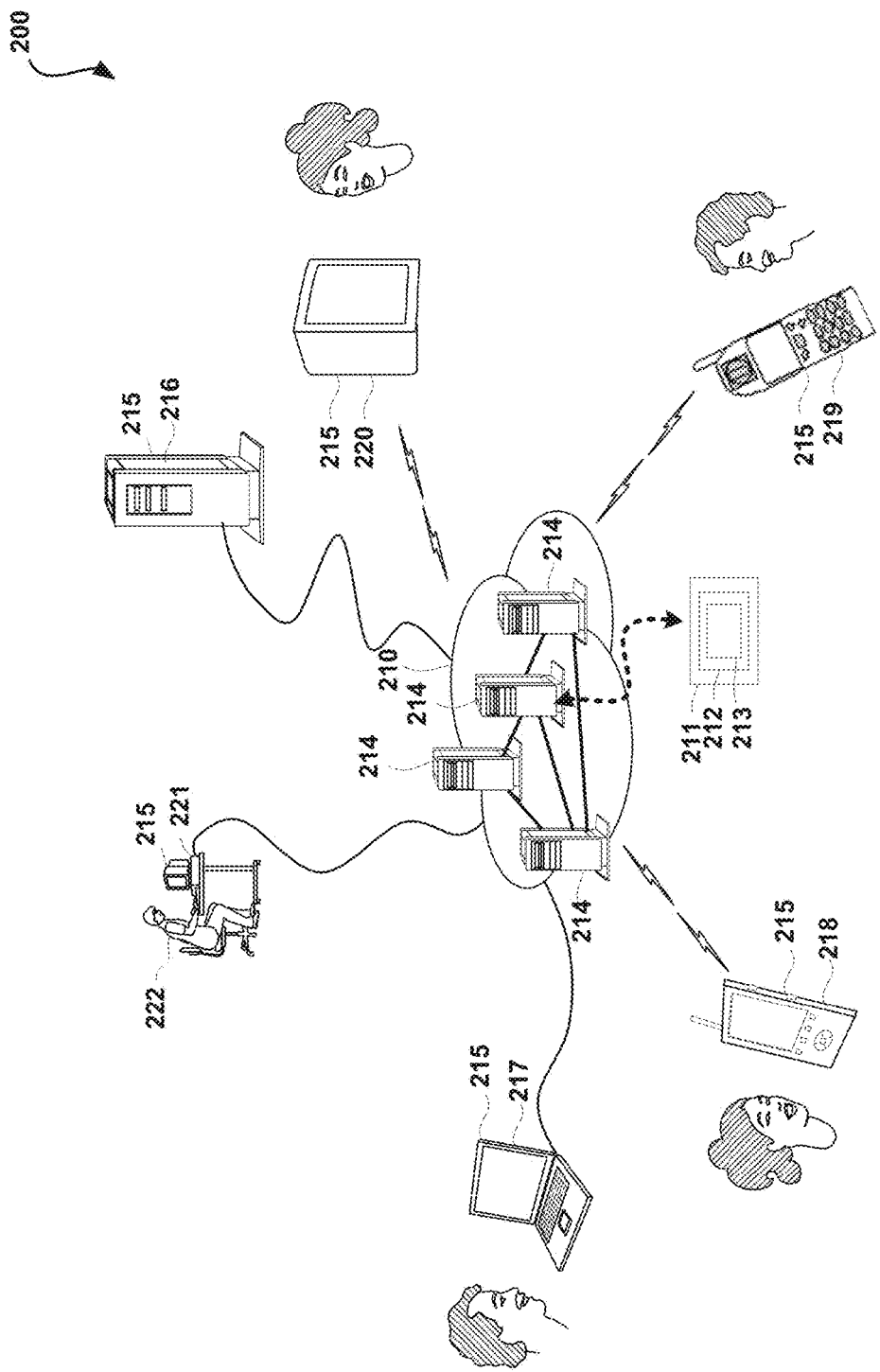
FIG. 2 illustrates a simplified diagram of a system associated with an NFV-based communication network, in accordance with one embodiment.

FIG. 2 illustrates a simplified diagram of a system 200 associated with an NFV-based communication network 210, in accordance with one embodiment. As an option, the system 200 may be implemented in the context of the details of FIG. 1. Of course, however, system 200 may be implemented in the context of any desired environment. Further, the aforementioned definitions may equally apply to the description below.

As shown in FIG. 2, at least one NFV-based network 210 is provided. The NFV-based communication network 210 includes an NFV management system 2111, an NFV-orchestration (NFV-O) module 212, and a cost determination module 213, according to one embodiment.

In the context of the present network architecture, the NFV-based network 210 may take any form including, but not limited to a telecommunications network, a local area network (LAN), a wireless network, a wide area network (WAN) such as the Internet, peer-to-peer network, cable network, etc. While only one network is shown, it should be understood that two or more similar or different NFV-based networks 210 may be provided.

The NFV-based network 210 may include one or more computation facilities 214, each including one or more hardware units and being interconnected by communication links to form the NFV-based network 210. At least one of the computation facilities 214 may include the NFV management system 211. The NFV management system 211 may include the NFV-O module 212 and the cost determination module 213.

The NFV-O module 212 may be executed by one or more processors, or servers, such as computation facilities 214, of the NFV-based network 210. The NFV-O module 212 may be executed as an NFV-O instance or component. The NFV-O module 212 may therefore include a plurality of NFV-O instances or components as will be further explained below.

The cost determination module 213 may be a part or a component of the NFV-O module 212. However, the cost determination module 213, the NFV-O module 212 and the NFV management system 211 may be separate software programs provided by different vendors. In one embodiment, the NFV-based network 210 may even have a plurality of any of the NFV management systems 211, the NFV-O modules 212, and/or the cost determination module 213.

A plurality of devices 215 are communicatively coupled to the NFV-based network 210. For example, a server computer 216 and a computer or terminal 217 may be coupled to the NFV-based network 210 for communication purposes. Such end-user computer or terminal 217 may include a desktop computer, a lap-top computer, a tablet computer, and/or any other type of logic or data processing device. Still yet, various other devices may be coupled to the NFV-based network 210 including a personal digital assistant (PDA) device 218, a mobile phone device 219, a television 220 (e.g. cable, aerial, mobile, or satellite television, etc.) 2, etc. These devices 215 may be owned and/or operated by end-users, subscribers and/or customers of the NFV-based network 210. Others of the devices 215, such as administration station 221, may be owned and/or operated by the operator of the NFV-based network 210.

A network administrator 222 may supervise at least some aspects of the operation of the NFV-based network 210 by controlling an NFV infrastructure including the NFV management system 211, the NFV-O 212, and the cost determination module 213.

Figure 3:
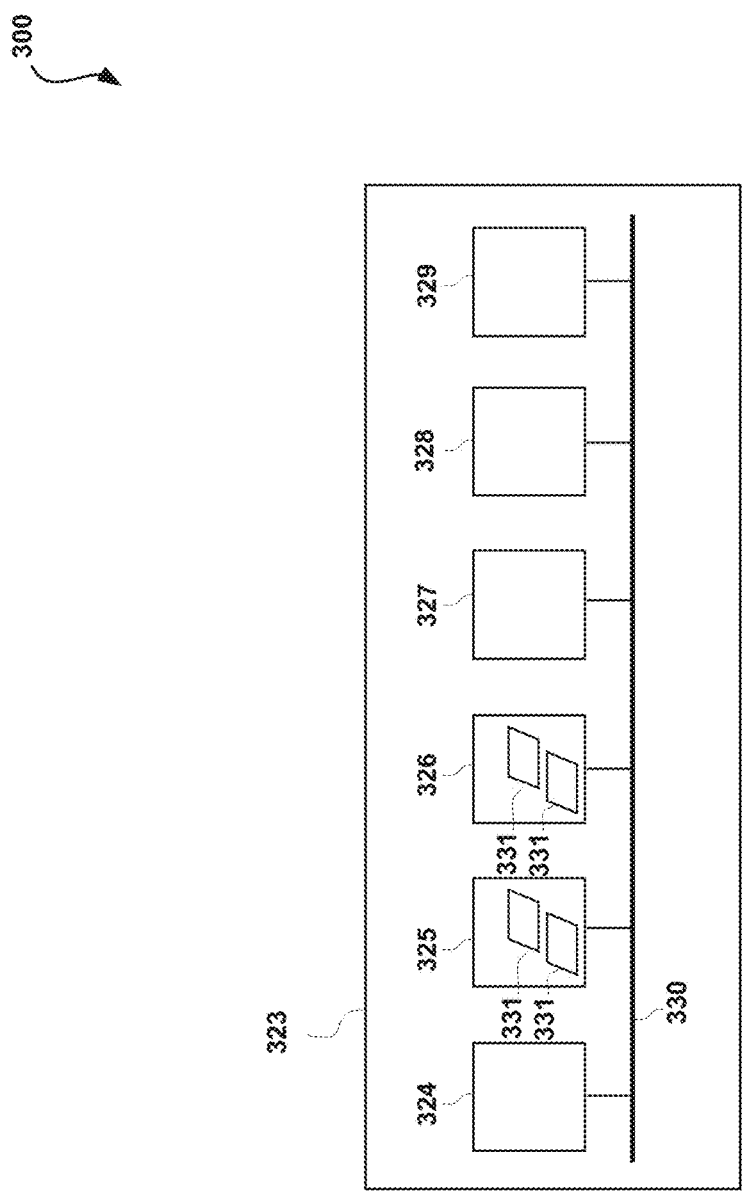
FIG. 3 illustrates a simplified block diagram of a hardware unit of an NFV-based network, in accordance with one embodiment.

FIG. 3 illustrates a simplified block diagram 300 of a hardware unit 323 of an NFV-based network, in accordance with one embodiment. As an option, the block diagram 300 may be viewed in the context of the details of the previous Figures. Of course, however, block diagram 300 may be viewed in the context of any desired environment. Further, the aforementioned definitions may equally apply to the description below.

In one embodiment, the hardware unit 323 may represent a computing facility 214 of FIG. 2, or a part of a computing facility 214. The hardware unit 323 may include a computing machine. The term computing machine relates to any type or combination of computing devices, or computing-related units, including, but not limited to, a processing device, a memory device, a storage device, and/or a communication device.

The hardware unit 323 may therefore be a network server, and the computing facility 214 may be a plurality of network servers, or a data-center, including cloud-based infrastructure. As an option, the hardware unit 323 may be implemented in the context of any of the devices of the NFV-based network 210 of FIG. 2 and/or FIG. 5 and in any desired communication environment.

Each hardware unit 323 (or computing machine, computing device, computing-related unit, and/or hardware component, etc.), including each communication link between such hardware units, may be associated with one or more performance type and a respective performance rating or value, where the hardware unit and/or communication link is operative to provide the performance value. Performance types are, for example, processing power, cash memory capacity, regular memory capacity (e.g. RAM, dynamic, or volatile memory, etc.), non-volatile memory (e.g. such as flash memory, etc.) capacity, storage capacity, power, cooling, bandwidth, bitrate, latency, jitter, bit error rate, and packet loss, etc. Virtual machines may run on top of the hardware unit 323 and a VNF may be run on one or more of such virtual machines.

The hardware unit 323 may be operative to provide computing infrastructure and resources for any type and/or instance of software component executed within the NFV-based network 210 of FIG. 2. In this regard, the hardware unit 323 may be operative to process any of the processes described herein, including but not limited to, any NFV-related software component and/or process. The hardware unit 323 is operative to process virtual network functions (VNFs), VNF instances, network function virtualization orchestration (NFV-O) software, modules and functions, data center management software, and/or cloud management systems (CMS), etc.

In various embodiments, the hardware unit 323 may include at least one processor unit 324, one or more memory units 325 (e.g. random access memory (RAM), a non-volatile memory such as a Flash memory, etc.), one or more storage units 326 (e.g. including a hard disk drive and/or a removable storage drive, representing a floppy disk drive, a magnetic tape drive, a compact disk drive, etc.), one or more communication units 327, one or more graphic processors 328 and displays 329, and one or more communication buses 330 connecting the various units/devices.

The hardware unit 323 may also include one or more computer programs 331, or computer control logic algorithms, which may be stored in any of the memory units 325 and/or storage units 326. Such computer programs, when executed, enable the hardware unit 323 to perform various functions (e.g. as set forth in the context of FIG. 1, etc.). The memory units 325 and/or the storage units 326 and/or any other storage are possible examples of tangible computer-readable media.

It is appreciated that computer program 331 may include any of the NFV management system 211, the NFV-O 212, and/or the cost determination module 213 of FIG. 2.

Figure 4:
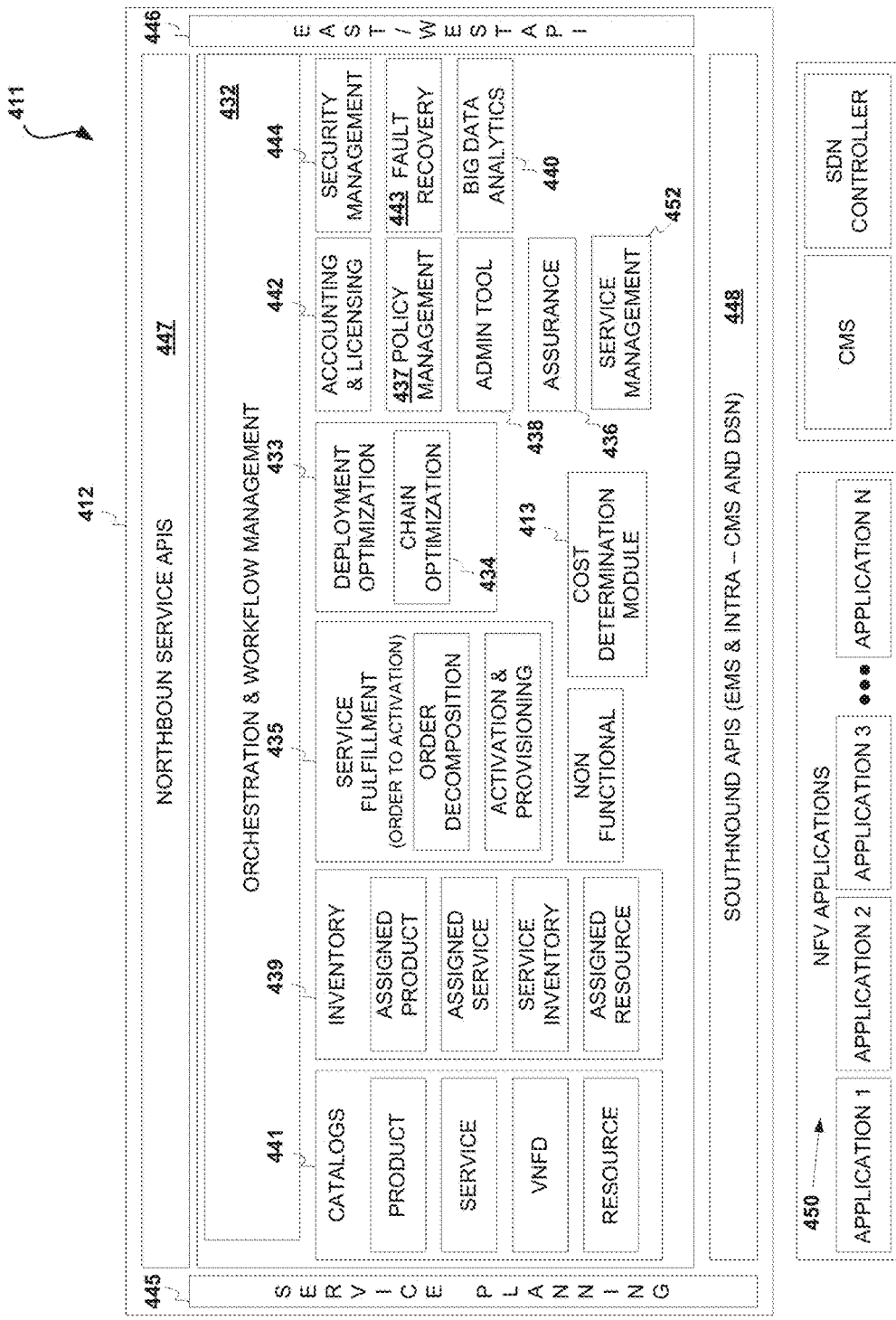
FIG. 4 illustrates a simplified diagram of an NFV management system, in accordance with one embodiment.

FIG. 4 illustrates a simplified diagram of an NFV management system 411, in accordance with one embodiment. As an option, the NFV management system 411 may be implemented in the context of the details of the previous Figures. For example, in one embodiment, the NFV management system 411 may represent the NFV management system 211 of FIG. 2. Of course, however, the NFV management system 411 may be implemented in the context of any desired environment. Further, the aforementioned definitions may equally apply to the description below.

In one embodiment, the NFV management system 411 may include an NFV-O module 412, and a cost determination module 413. The NFV management system 411 may include one or more NFV-O modules 412. In various embodiments, each of the NFV-O modules 412 may include orchestration and workflow management 432 that is responsible for managing (i.e. orchestrating) and executing all NFV-O processes, including inbound and/or outbound communication and interfaces.

The NFV management system 411 may include a deployment optimization module 433 that enables a user to devise automatic mechanisms for network optimizations. The deployment optimization module 433 may operate these mechanisms automatically and continuously to optimize the distribution of VNFs 450 and their VNF instances in real-time (or near-real-time) by migrating VNFs 450 and VNF instances (e.g. VNF instances 551 of FIG. 5, etc.) between hardware units (e.g. hardware units 551 of FIG. 5, etc.).

The NFV management system 411 may also include a chain optimization module 434. The chain optimization module 434 may be a part of deployment optimization module 433 and may enable a user to devise automatic mechanisms for optimizing the deployment of chains or groups of VNFs 450 and VNF instances. A service provided by an NFV-based network is typically made of a particular chain or group of particular VNFs 450 and their respective VNF instances. The chain optimization module 434 optimizes the deployment of chains or groups of services between hardware units according to the requirements and specifications associated with and/or adapted to the particular service, or chain, or a group.

The chain optimization module 434 may operate these mechanisms automatically and continuously to optimize in real-time the operation of chains or groups of the VNFs 450 and their VNF instances by re-planning their distribution among hardware units and optionally also by migrating the VNFs 450 and associated VNF instances between hardware units.

The NFV management system 411 may also include a service fulfillment module 435 that manages service and resource (e.g. VNF) instance lifecycle activities as part of the process and orchestration activities. This may include on boarding, initiation (e.g. instantiation), installation and configuration, scaling, termination, software update (e.g. of a running VNF, etc.), test environment, and/or rollback procedure. Additionally, the service fulfillment module 435 may also provide decomposition of an order to multiple network services, and the activation of such network service as a single VNF instance, or as a chain of VNF instances.

Order decomposition includes translating business orders into a network oriented service implementation plan. For example, a business order may be decomposed into a plurality of functions, some of which may be provided by different software programs or modules (e.g. such as various VNFs) instantiated as a plurality of VNF instances across one or more data centers. Performing order decomposition, the service fulfillment module 435 may consult the deployment optimization module 433 for the best deployment option to customer order in a given network and resource condition. Performing order decomposition, the service fulfillment module 435 may then initiate the service including all its components. Order decomposition may be performed in several locations across an NFV-O hierarchy. For example, initial decomposition may be performed in the root of the NFV-O, and then further decomposition may be performed in the relevant data centers.

In one embodiment, an activation and provisioning module may provide the plan for activation and provisioning of the service to the orchestration and workflow management 432. The activation and provisioning module may also provide feedback on fulfilment status to an upper layer. This upper layer may include the business support services (BSS).

The NFV management system 411 may also include an assurance module 436 and a service management module 452 capable of gathering real time data on network elements' status and creating a consolidated view of services and network health. The assurance module 436 includes assurance functionality and may interact with the service management module 452 to perform assurance related lifecycle management procedures. Lifecycle management can be also triggered by other modules, policies, manual intervention, or from the VNFs themselves, etc. The assurance module 436 and the service management module 452 may also trigger events associated with lifecycle management and faults. The assurance module 436 and the service management module 452 may monitor the health of the network and may execute fault recovery activities.

The assurance module 436 and the service management module 452 provide the ability to monitor services' status and performance according to the required criteria. The assurance module 436 and the service management module 452 may also interact with the network infrastructure (e.g. including computing, storage, and networking, etc.) to receive the required information, analyze the information, and act upon each incident according to the defined policy. The assurance module 436 and the service management module 452 are able to interact with analytics to enrich a policy assurance module. Interfaces may also be provided for implementation by an external system.

The NFV management system 411 may also include a policy management module 437 that enables a user to define and configure offline and/or real-time policy for controlling VNF and service related rules. The policy management module 437 may contain the preconfigured policies and activities as well as selection rules for the NFV-O process to determine the preferred policy or activity to be performed for a particular process event. The policy management may be multi-layered, including vendor policy, service policy, and operator policy, etc. The policy mechanism may trigger the suitable policy layer (vendor/service/operator).

The NFV management system 411 may also include an administration module 438 that provides an overall view of the network, manual lifecycle management and intervention, and manual system administration and configuration. The administration module 438 may be operable to enable a user such as an administrator (e.g. administrator 222 of FIG. 2, etc.) to manage, view, and operate the NFV-O system. The administration module 438 may also provide a view of the network topology and services, the ability to perform specific activities such as manual lifecycle management, and changing service and connectivity configuration.

The NFV management system 411 may also include an inventory management module 439 that maintains a distributed view of deployed services and hardware resources. Inventory catalogues may reflect the current instantiation and allocation of the resources and services within the network mapped into products and/or customer entities.

The NFV management system 411 may also include a big data analytics module 440 that analyzes network and service data to support network decisions involving services and subscribers to improve network performance based on actual usage patterns. The big data analytics module 440 may also generate what-if scenarios to support business-oriented planning processes. Additionally, the big data analytics module 440 may function to analyze and evaluate the information for various planning aspects (e.g. Virtual Network Capacity Planning, Data Center Capacity Planning, Value based planning, Cost analysis for network deployment alternatives, etc.), deployment and management (e.g. Guided Operator Recommendations, What-if scenario analysis and simulation, application rapid elasticity and resource usage optimization, etc.), and may support business-oriented planning processes.

The NFV management system 411 may also include a catalog module 441 may include records defining various aspects of the network, such as products, services, and resources such as hardware units and VNFs (e.g. a VNF directory, etc.). The catalog module 441 may include a collection of centralized, hierarchical information repositories containing resource, service and product definitions with their relationship, versioning, and/or descriptors, etc. Such records may include templates enabling a user, such as an administrator, to define particular network components such as resources, products, services, etc. A resource template may define resources descriptors, attributes, activities, procedures, and/or connectivity, etc. A service template may define a service variation from resource building blocks. A product template may define parameters of a sellable product (e.g. prices, rating, etc.) based on service composition (e.g. in one embodiment, this may be part of a BSS catalogue).

The inventory management module 439, the big data analytics module 440, and/or the catalog module 441 may support multiple data centers, multiple CMSs and provide a centralized view across the infrastructure. The inventory management module 439, the big data analytics module 440, and/or the catalog module 441 may also support hybrid networks and services maintaining both physical and virtual resources.

The NFV management system 411 may also include an accounting and licensing module 442 that may be operable to record and manage network software usage data for commercial purposes including licensing, accounting, billing, and reconciliation of services with subscribers and providers. The accounting and licensing module 442 may manage licensing and usage of virtual network applications, including the ability to support complex rating schemes, based on various parameters such as CPU, memory, data, etc. The accounting and licensing module 442 may enable users to define the pricing of particular VNF modules and provide settlement with vendors. The accounting and licensing module 442 may also enable the evaluation of internal costs of services provided within the network for calculating return on investment (ROI).

The NFV management system 411 may also include a fault recovery module 443 (otherwise named disaster recovery planning module or DRP, etc.) that enables a user to plan and manage disaster recovery procedures for the NFV-O and/or the entire network.

The NFV management system 411 may also include a security management module 444 that provides the authentication authorization and accounting services of application security across the network. The security management module 444 may include, for example, an authentication module and function. In one embodiment, the authentication module and function (e.g. including identity management, etc.) may authenticate the identity of each user defined in the system. Each user may have a unique user identity and password. The system may support password based authentication with flexible password policy. Integration with external authentication providers may be done via additional system enhancements. The authorization module and function may support a role-based access control (RBAC) mechanism, where each user is assigned with one or more roles according to the business needs based on the least privileges concept (e.g. standard or administrator roles). In one embodiment, the accounting and licensing module 442 may provide an audit of security events such as authentication or login events.

As an option, the security management module 444 may use rules to protect sensitive information. For example, such rules may be used to ensure the data accessed is used for the specific purposes for which it was collected, sensitive information is encrypted when in storage/transit and masked/truncated on display and logs, and that the entire security system is deployed in the customer's intranet network (i.e. behind network/infrastructure measures), in an independent domain, etc.

In one embodiment, the NFV management system 411 may further include a Secure Development Life Cycle (SDLC) module that ensures that security aspects are handled during a project's life cycle, such as security design, security testing, etc.

As shown further in FIG. 4, the NFV management system 411 may include a service planning module 445. The service planning module 445 may be used by a communication service provider (CSP) sales representative, enterprise, and/or technician, as part of selling engagement process with enterprise/SMB customers.

The service planning module 445 may also provide the ability to interact with catalogues, customer data, network and ordering systems to provide online network service proposals for the enterprise customers with ability to quote update the proposal, validate the serviceability and network inventory, and once done, provide the service order for activation using the northbound interface.

The cost determination module 413 may also be part of the NFV-O module 412. The cost determination module 413 may be operable to implement the functionality described in the context of FIG. 1 (e.g. some or all of the operations associated with method 100).

The NFV management system 411 may also include east-west APIs 446 that include various domains/activities interfaces, including an information source to a big data repository, and interaction capability with a physical network system (OSS).

Northbound APIs 447 provides application programming interfaces (APIs) to various external software packages, such as business support system (BSS) for service order fulfilment, cancel and update activities, status notification, resource inventory view, monitoring system, assurance system, service planning tool, administration tool for system view and configuration, and big data repository, etc.

Further, the southbound APIs 448 may provide APIs for external software packages, such as CMS (including service and VNFs lifecycle activities—receiving from the infrastructure status and monitoring information for upstream system and activities [e.g. assurance]), an SDN Controller (or other connectivity system) to configure inter and intra data center connectivity, an EMS to configure the VNF, and a VNF for a direct configuration.

Figure 5:
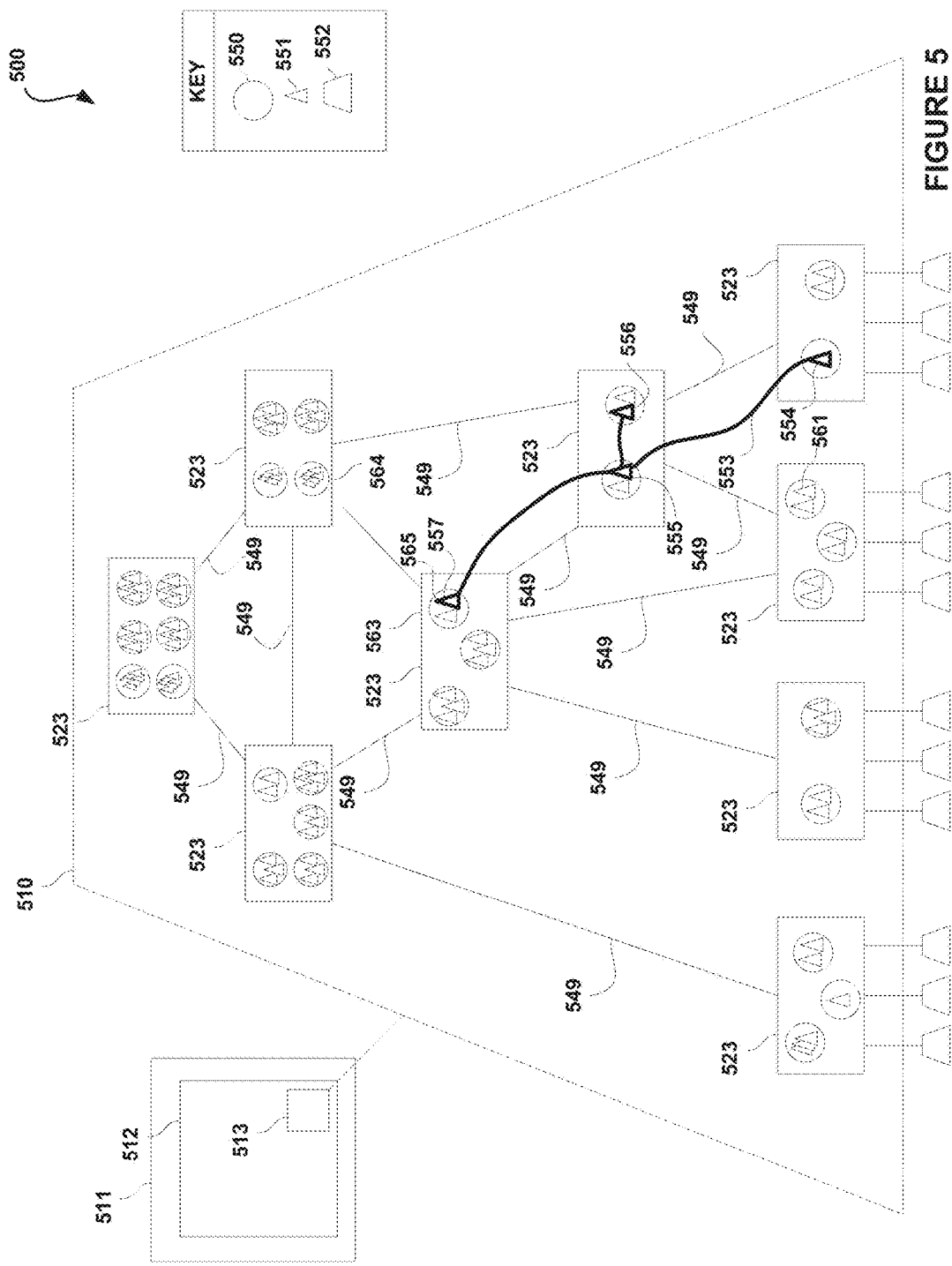
FIG. 5 illustrates a simplified diagram of a deployed NFV-based network, in accordance with one embodiment.

FIG. 5 illustrates a simplified diagram 500 of a deployed NFV-based network 510, in accordance with one embodiment. As an option, the diagram 500 may be viewed in the context of the details of the previous Figures. For example, in one embodiment, the deployed NFV-based network 510 and associated elements may represent the NFV-based networks and associated elements described in the context of the previous Figures. Of course, however, the diagram 500 may be viewed in the context of any desired environment. Further, the aforementioned definitions may equally apply to the description below.

As shown in FIG. 5, the NFV-based network 510 may include hardware units 523 connected via transmission lines 549, and VNFs implemented as software programs 550 installed in hardware units 523. Some of the hardware units 523 may be directly connected to a customer. The customer may be a subscriber, an end-user, or an organization, represented herein as a terminal or a server 552, or a plurality of terminals and/or servers 552. The NFV-based network 510 may also include a NFV management system 511, an NFV-orchestration (NFV-O) 512, and a cost determination module 513 (which may all represent elements described in the context of the previous figures, etc.).

As shown further in FIG. 5, several, typically different, VNFs 550 may be installed in the same hardware unit 523. Additionally, the same VNF 550 may be installed in different hardware units 523.

A VNF 550 may be executed by a processor of the hardware unit 523 in the form of a VNF instance 551. Therefore, a particular VNF 550 installed in a particular hardware unit 523 may be "incarnated" in (e.g. initiated, executed as, etc.) any number of VNF instances 551. The VNF instances 551 may be independent of each other. Additionally, each VNF instance 551 may serve different terminals and/or servers 552. The NFV-based network 510 connects to and between communication terminal devices 552 that may be operated by one or more customers, subscribers, and/or end-users.

It is appreciated that a network operator may manage one or more services deployed in the customer's premises. Therefore, some of the hardware units 523 may reside within the premises of the network operator, while other hardware units 523 may reside in the customer's premises. Similarly, a server, such as server computer 216 of FIG. 2, may reside in the premises of the network operator or in the customer's premises. Consequently, when the network operator provides and/or manages one or more services for a customer's terminal devices 552 such as a server computer, the NFV-based network 510 of the network operator may directly manage the VNFs 550, providing the services and their VNF instances 551.

In such situation, the NFV-based network 510 may manage the services irrespectively of the location of the terminal devices 552 (e.g. the server computer 216, etc.), whether in the premises of the network operator or in the customer's premises. In other words, the NFV-based network 510 may be managing the VNFs 550 and the VNF instances 551 providing the services, as well as the terminal devices 552 (e.g. the server computer 216, etc.) being co-located within the same computing device (e.g. the hardware unit 523, etc.), whether in the premises of the network operator or in the customer's premises or in a commercial cloud or any other place.

A service provided by the communication network may be implemented using one or more VNFs. For example, the service may be a group, or a chain of interconnected VNFs. The VNFs making the group, or the service, may be installed and executed by a single processor, by several processors on the same rack, within several racks in the same data-center, or by processors distributed within two or more data-centers. In some cases, chain optimization may be employed by optimizing the deployment of a service in a communication network using network function virtualization, and to optimizing the deployment of a group, or a chain, of virtual network functions in the NFV-based network 510. Therefore, the term "chain optimization" refers to the planning and/or managing of the deployment of VNFs making a chain, or a group, of VNFs providing a particular service.

For example, FIG. 5 shows a first service 553, including the VNFs 550 and their respective VNF instances 554, 555, 556, and 557, and a thick line. In this example, the group or chain of the VNFs 550 making first service 553 are connected as a chain of VNFs 550. However, the VNFs 550 making a service may be connected in any conceivable form such as a star, tree-root, tree-branch, mesh, etc., including combinations thereof. It is noted that the VNFs 550 may be executed by two or more VNF instances 551, such as VNF 554.

The deployment of the group or chain of the VNFs 550 making the first service 553 is therefore limited by constraints such as the capacity of the communication link 549 bandwidth and/or latency (delay).

A VNF may have a list of requirements, or specifications, such as processing power, cash memory capacity, regular memory capacity (e.g. RAM, dynamic, or volatile memory, etc.), non-volatile memory (e.g. such as flash memory, etc.) capacity, storage capacity, power requirements, cooling requirements, etc. A particular VNF instance 551 providing a particular function (e.g. to a particular customer, entity, etc.) may have further requirements, or modified requirements, for example, associated with a particular quality of service (QoS) or service level agreement (SLA). Such requirements may include maximum latency or delay, average latency and maximum variance (latency jitter), maximal allowed packet loss, etc. Other requirements may include service availability, redundancy, backup, provisions for rollback and/or recovery, fault-tolerance, and/or fail-safe operation, etc.

A service made of a chain or a group of VNFs 550 and their VNF instances 551 may have a similar list of requirements, or specifications, covering the service as a whole. Therefore, such requirements, or specifications, may imply, affect, or include, requirements, or specifications, regarding communication links between the VNFs 550 and/or the VNF instances 551. Such requirements, or specifications, may include bandwidth, latency, bit-error rate, and/or packet loss, etc. Such communication requirements or specifications may further impose deployment limitations, or constraints, requiring particular VNFs 550 and/or VNF instances 551 to reside in the same data-center, or within the same rack, or even in the same computing device, for example, sharing memory or being executed by the same processor. Security measures may add further requirements, or specifications, such as co-location of some of the VNFs 550 and/or the VNF instances 551.

In the context of FIG. 5, the NFV-based network 510 has a hierarchical structure. There may be at least four aspects of the hierarchical structure of the NFV-based network 510. The networking or traffic aspect refers to the arrangement of the transmission lines between the hardware units 523. The processing aspect refers to the arrangement of the hardware units 523. The software aspect refers to the arrangement of the VNFs 550. The operational aspect refers to the arrangement of the VNF instances 551.

One aspect of the optimization process in an NFV-based network is that it may be based on real-time needs, rather than long-term, statistically anticipated, needs. One potential limitation on network reconfiguration in NFV-based networks is that network configuration does not result in a deterioration beyond acceptable level of any of the current services. The NFV deployment module (e.g. module 433 of FIG. 4, etc.) may function to enable and manage migration of services between the hardware units 523, the VNFs 550, and the VNF instances 551 in real-time, without affecting or with a minimal effect on the availability of a service, and while securing service and session continuity.

In the context of the current description, the term "continuous" means that the deployment optimization module and/or a chain optimization module (e.g. the chain optimization module 434 of FIG. 4, etc.) performs the relevant optimization task or process in run-time, or real-time, or online, or on-the-fly, or repetitively and without adversely affecting the network's functionality and its services.

Unlike a legacy network, the NFV-based network may have two topologies: the topology of the hardware devices, and the topology of the VNFs (the distribution of VNFs among the hardware devices). The topology of the hardware network is relatively stable, while the VNF topology can be optimized in real-time. Another benefit of the NFV-based network is that modifying the software topology (e.g. the distribution of VNFs among the hardware devices) is much less costly than any modification of the hardware topology. However, any modification of the network has its cost, including the cost of making such modification possible. Added cost may result from the need to process the modification of the topology and the re-distribution of VNF instances and to maintain excess resources for such purpose.

Thus, in some cases, it may be desired to localize the NFV-O 512, and particularly the deployment optimization processes associated with the deployment optimization module and the chain optimization module to reduce the cost, and simultaneously to secure the possibility to expand the scope of the network managed by these processes, if needed.

Figure 6:
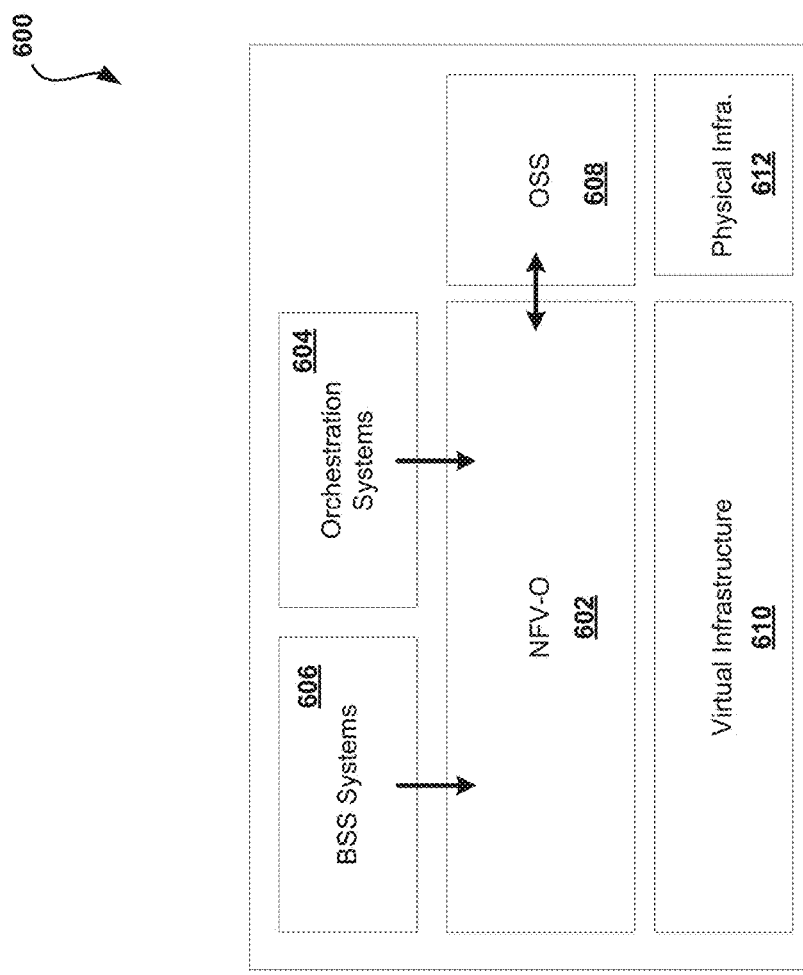
FIG. 6 illustrates a system showing an NFV-O integration with a wider environment, in accordance with one embodiment.

FIG. 6 illustrates a system 600 showing an NFV-O integration with a wider environment, in accordance with one embodiment. As an option, the system 600 may be implemented in the context of the details of the previous Figures. Of course, however, the system 600 may be implemented in the context of any desired environment. Further, the aforementioned definitions may equally apply to the description below.

The NFV-O 602 is designed to support interoperability within a wider environment, which may introduce additional high level orchestration systems. The available APIs and integration point enables a service provider to easily integrate the NFV-O 602 with an additional orchestration layer 604, in addition to BSS systems 606.

The NFV-O 602 may expose all functionalities to higher systems such as the BSS 606 and higher level orchestration systems 604 using industry standards such as REST APIs. Once the NFV-O 602 receives an order from the BSS system 606 or the third party orchestration system 604, it will relay actions on to physical devices 612 to an OSS 608, while orchestrating virtual functions on a virtual infrastructure 610.

Figure 7:
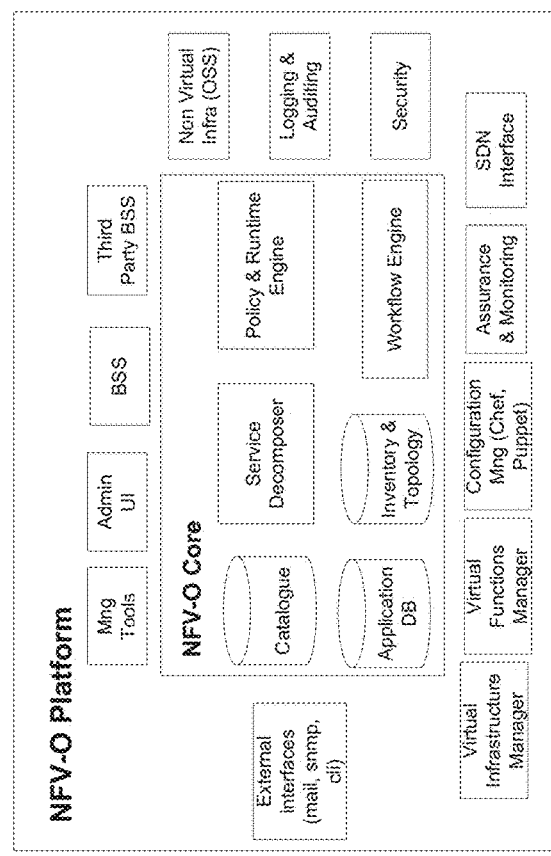
FIG. 7 illustrates a high level view of an NFV-O platform, in accordance with one embodiment.

FIG. 7 illustrates a high level view of an NFV-O platform 700, in accordance with one embodiment. As an option, the NFV-O platform 700 may be implemented in the context of the details of the previous Figures. Of course, however, the NFV-O platform 700 may be implemented in the context of any desired environment. Further, the aforementioned definitions may equally apply to the description below.

The NFV-O platform 700 is an open, easily integrated platform supporting custom integration as well as many ecosystem vendors at all layers of the NFV stack, including the bare metal Servers, Hypervisors, Cloud Management Systems, SDN controllers, and Virtual Networks Functions (VNFs).

The NFV-O platform 700 provides various interfaces with multiple parties including infrastructure, functions, and monitoring points, and also northbound interfaces to enable higher level workflows, data access APIs including analytics results, and monitoring APIs. The NFV-O platform 700 is API-rich to allow flexible integrations and high levels of compatibility.

For the Southbound, the NFV-O platform 700 provides Cloud Management System (CMS) and an SDN Controller, in addition to direct interfaces to VNFs and/or EMS, and a Monitoring and Activation notifications API.

For the Eastbound, the NFV-O platform 700 provides an information source to a Big Data repository and interaction capability with the network system (OSS).

On the Northbound, the NFV-O platform 700 provides a BSS system for service order fulfillment, cancels and updates of activities, status notifications, resource inventory views, etc., as well as a monitoring system, assurance system, Service Planning tool, an admin tool for system view and configuration, and an API to the Big Data repository.

A physical system can be defined as a data-center with existing infrastructure of compute resources (e.g., servers), storage resources and network resources.

Figure 8:
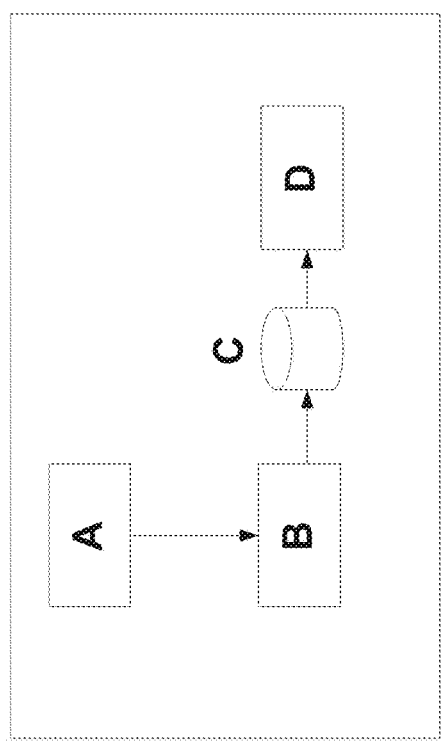
FIG. 8 illustrates an example showing a physical service, in accordance with one embodiment.

FIG. 8 illustrates an example 800 showing a physical service, in accordance with one embodiment. As an option, the example 800 may be implemented in the context of the details of the previous Figures. Of course, however, the example 800 may be implemented in the context of any desired environment. Further, the aforementioned definitions may equally apply to the description below.

A physical service may be modeled as a specific deployment of a service in the physical system, which may interconnect different compute resources and/or network resources for some dedicated functionality. In reality, it could be a physical box connected to other services.

Figure 9:
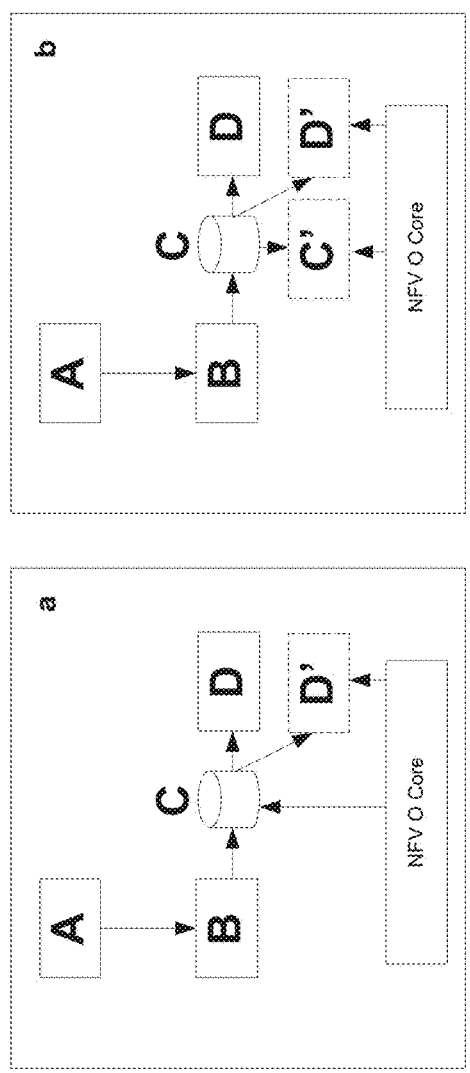
FIG. 9 illustrates an example showing a deployment of an NFV-O model in a physical system, in accordance with one embodiment.

FIG. 9 illustrates an example 900 showing a deployment of an NFV-O model in a physical system, in accordance with one embodiment. As an option, the example 900 may be implemented in the context of the details of the previous Figures. Of course, however, the example 900 may be implemented in the context of any desired environment. Further, the aforementioned definitions may equally apply to the description below.

The NFV-O core may be installed as a closed software package, which is able to communicate with the appropriate APIs (e.g. OpenStack APIs, etc.) running in the physical system to dynamically control the relevant compute, storage and networking assets to enable 'additions' of a virtual services on top of existing 'physical' services. This addition can be done by reusing compute resources and launching required virtual machines (VMs), or by adding new compute resources to facilitate the NFV-O core compute requirements.

As shown in FIG. 9, the NFV-O core is deploying a new virtual service D' while reusing the network element C (e.g., which may support OpenStack network configuration), or deploying both new virtual service D' and network element C'.

In one embodiment, virtual and physical systems may be combined under one orchestrator. One case is when no change to the physical system needs to be undertaken and the system can be oblivious to the existence of the new orchestrator, which treats it as a black box. This may be accomplished by adding the NFV-O and connecting it to the network elements.

As not all network elements may be capable of the connection, the NFV-O may have partial connectivity to the physical system. For example, if there are two services that are chained and there is no connection between them, but there is a network connection on either side, it may be possible to replace both of them with virtual services but not any single one of them.

In this case, the NFV-O may, in time of high demand, execute a virtual system in parallel to the physical system. The upgrade is to take a legacy physical system, add an orchestrator that normally uses the physical system but in time of overload uses a virtual service.

Sometimes network elements may need to be added to the physical system to enable more flexibility with the use of the orchestrator. In this case, the modifying of physical systems may be performed such that parts of it can be augmented by the virtual system (not only replaced).

Figure 10:
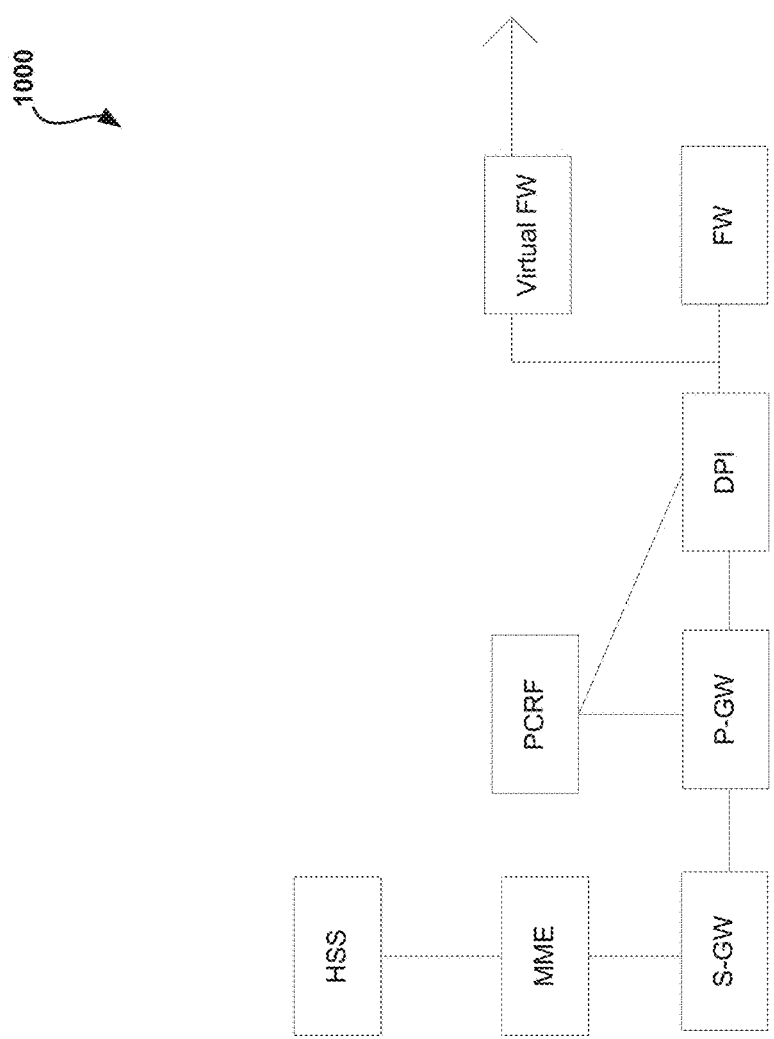
FIG. 10 illustrates an example showing a deployment of a virtual service in a physical system, in accordance with one embodiment.

FIG. 10 illustrates an example 1000 showing a deployment of a virtual service in a physical system, in accordance with one embodiment. As an option, the example 1000 may be implemented in the context of the details of the previous Figures. Of course, however, the example 1000 may be implemented in the context of any desired environment. Further, the aforementioned definitions may equally apply to the description below.

In this example, the physical service FW may not be able to handle more than 10,000 requests a second. In this case, there may be times when it is desirable to enable, on the fly, a virtual FW service.

Further, in may be desirable to be able to split demand before each service, send the demand both to the virtual service and the physical service. This may be accomplished as the network element between DPI and FW may be software controlled, and once connected to the NFV-O, this functionality is available.

Accordingly, in one embodiment, a physical system or partial physical system may be augmented with physical or virtual services to save money for a company. For example, a customer may already have a physical system. However, the customer's problem may be that sometimes at peak utilization the physical system does not have the capacity to serve everything. Accordingly, in one embodiment, a usage profile (and expected usage) may be evaluated to determine what additional physical systems/elements to purchase to accommodate utilization.

The cost calculation may assume that for physical systems/elements there is the cost of buying, which may be divided over time. For simplicity, the cost of electricity may be ignored (which depends on load) but this may be a cost that is considered, in addition to various other associated costs.

For virtual systems/elements, the assumption may be that installation is free and the cost is per usage. However, in other cases, installation may be part of the cost, as well as rental costs, etc.

The analysis for comparing a physical and virtual alternative may include looking at the expected usage scenario and optimizing by considering every physical alternative, which is not dominated by other physical alternatives (e.g. better and cheaper, etc.), and that makes sense. A physical component may make no sense to use if the cost of a virtual replacement at full workload for the entire period is less than the cost of the component.

Figure 11:
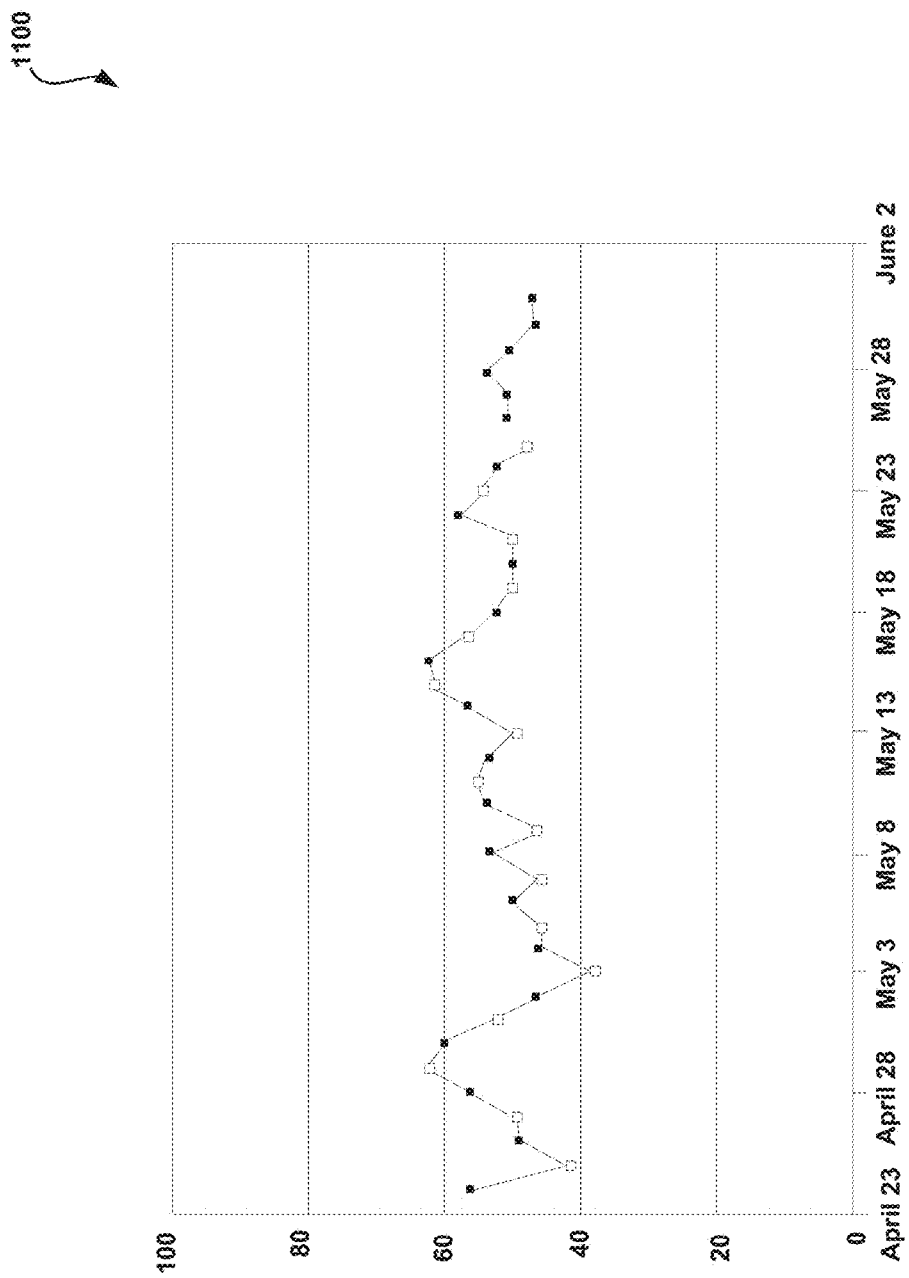
FIG. 11 illustrates an example of a usage graph for a physical system, in accordance with one embodiment.

As an example, there may be four possible physical systems with a capacity of 20 at a cost of 80 per year, a capacity of 40 at a cost of 110 per year, a capacity of 60 at a cost of 130 per year, and a capacity of 80 at a cost of 140 per year. Further, the overall system may have usage graph 1100 as shown in FIG. 11. Additionally, the cost of virtual service for a capacity of 20 per year is 60.

The system for 20 which costs 80, may be immediately be eliminated as the virtual replacement, as even the physical system fully utilized, is cheaper.

The expected average usage may be assumed to be, as seen from the graph, between 20 and 40 and average of 19.7, between 40 and 60 an average of 10, and between 60 and 80 an average of 0.5, and nothing above.

The total cost is the physical cost for the component plus the cost of virtual for overflow. The cost of the virtual for overflow may be the integral over the time period of the traffic when greater than the performance of the physical component.

In this case, there are the following options: Fully virtual=60*(20/20+19.7/20+10/20+0.5/20)=150.6; Physical component up to 40+virtual=110+60*(10/20+0.5/20)= 141.5; Physical component up to 60+virtual=130+60*(0.5/20)=131.5; and Physical component up to 80=140.

So, for this example, the best alternative is to have the physical component up to 60 and the rest virtual at the cost of 131.5. Even though the 80 capacity seems very competitively priced, because extra capacity over 60 is needed so rarely, it is better to buy up to 60 and for this rare occasion when it is not enough to use virtual system.

Thus, the process for the decision may include generating an expected log (e.g. estimated), getting costs for different physical components, and getting costs of virtual component usage. Using these inputs, a physical component to buy may be determined by applying the analysis described above.

If the cost functions are more complicated, more complicated analysis may be needed. If a user is composing a system of components, the same analysis that is true for the system is true for the components and services.

As another example, there may be two services, A1 and A2, which can be chained together form system A. So, the options are either to buy A, or to buy A1 and A2, or none (i.e. use only virtual elements). The costs are as follows: A1 has a capacity of 50 at a cost of 100 and a virtual cost per traffic of 3; A2 has a capacity or 100 at a cost of 100 and a virtual cost per traffic of 10; and A has a capacity of 70 at a cost of 190 and a virtual cost per traffic of 11. So, for example, if after analyzing the log the expected usage pattern is: from 0-50 a usage of 50; from 50-70 a usage of 12; from 70-100 a usage of 1; and above 100 a usage of 9, then: the cost of A1+A2=200 (physical)+(3*12+3*11+13*9) virtual=386; the cost A=190+11*11+9*11=410; and the cost of pure virtual is 11*(50+12+11+9)=902.

Thus, for this example, it is better to buy the two components then the subsystem. But if the log was: from 0-50 a usage of 50; from 50-70 a usage of 18; from 70-100 a usage of 3; and above 100 a usage of 2, then: the cost of A1+A2=200 (physical)+(3*18+3*3+13*2) virtual=289; and the cost A=190+11*3+11*2=245. In this case, A is better than A1+A2.

Thus, the choice depends on the log (and of course the cost of components and virtual usage). There could be many issues that make the calculation more complicated but the general idea stays the same. For example, the virtual cost could depend on the time (server farm change cost during the day) but the same idea will work, and what will be needed is a finer grained analysis of the log.

Figure 12:
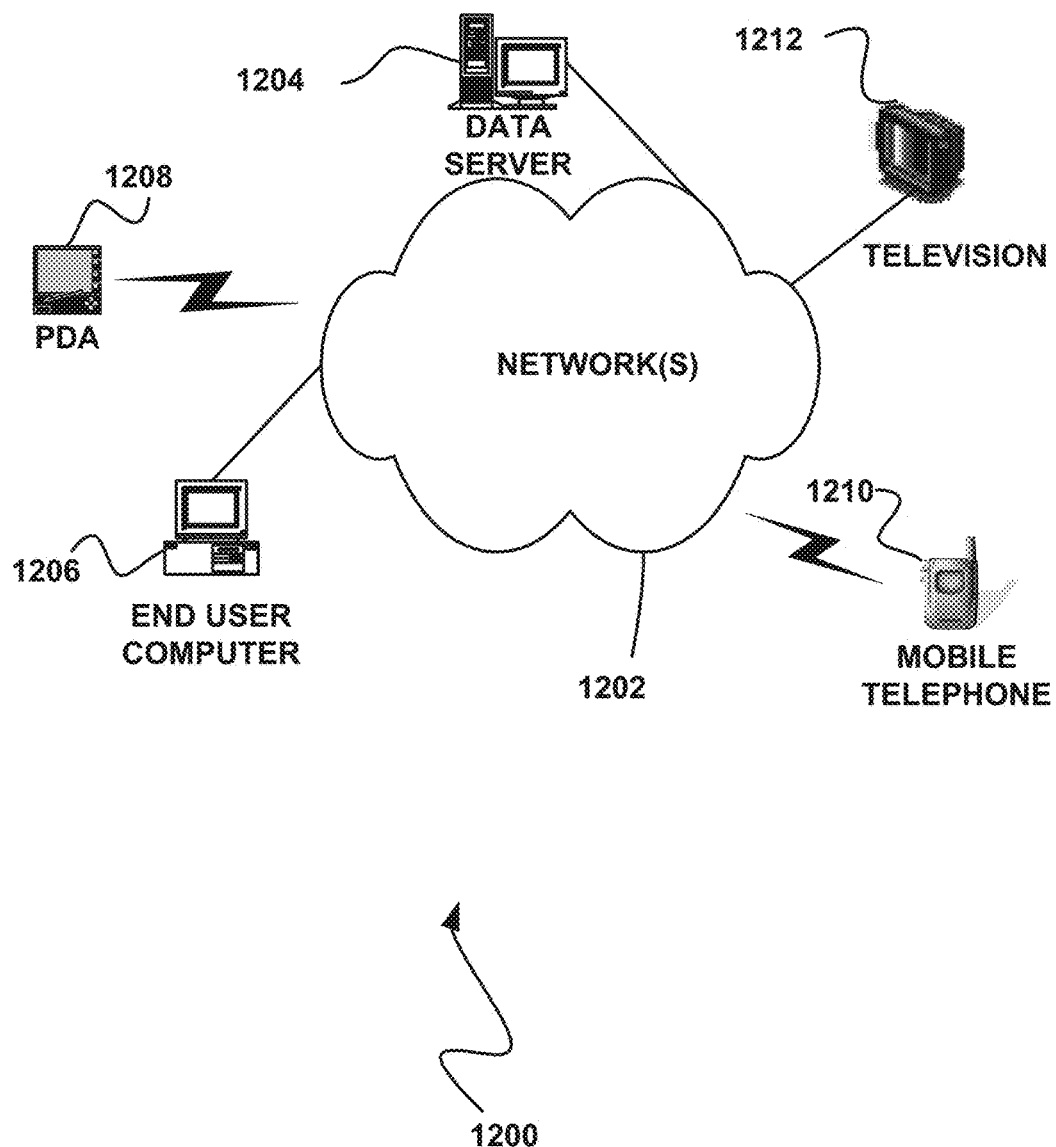
FIG. 12 illustrates a network architecture, in accordance with one possible embodiment.

FIG. 12 illustrates a network architecture 1200, in accordance with one possible embodiment. As shown, at least one network 1202 is provided. In the context of the present network architecture 1200, the network 1202 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1202 may be provided.

Coupled to the network 1202 is a plurality of devices. For example, a server computer 1204 and an end user computer 1206 may be coupled to the network 1202 for communication purposes. Such end user computer 1206 may include a desktop computer, lap-top computer, and/or any other type of logic. Still yet, various other devices may be coupled to the network 1202 including a personal digital assistant (PDA) device 1208, a mobile phone device 1210, a television 1212, etc.

Figure 13:
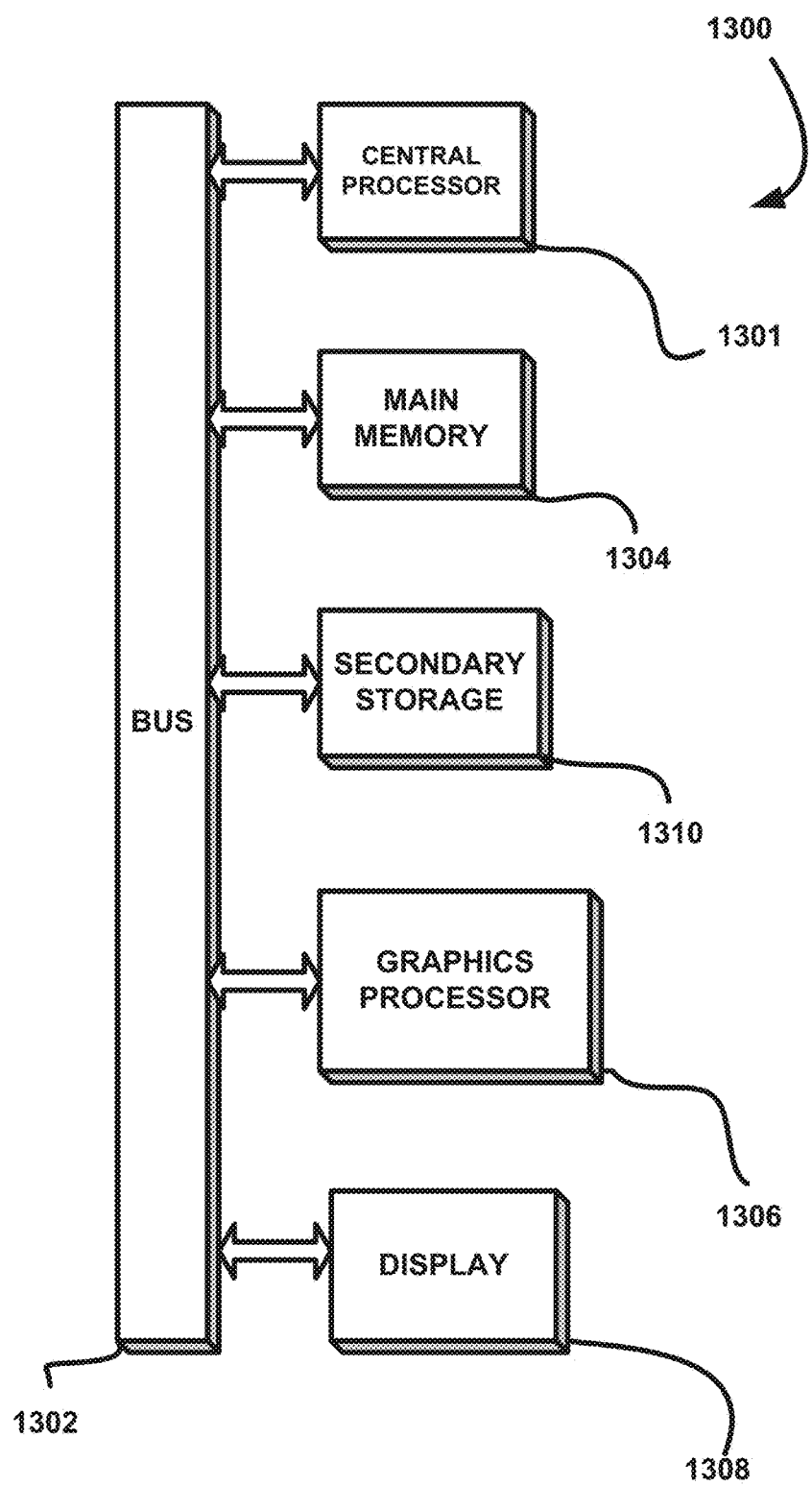
FIG. 13 illustrates an exemplary system, in accordance with one embodiment.

FIG. 13 illustrates an exemplary system 1300, in accordance with one embodiment. As an option, the system 1300 may be implemented in the context of any of the devices of the network architecture 1200 of FIG. 12. Of course, the system 1300 may be implemented in any desired environment.

As shown, a system 1300 is provided including at least one central processor 1301 which is connected to a communication bus 1302. The system 1300 also includes main memory 1304 [e.g. random access memory (RAM), etc.]. The system 1300 also includes a graphics processor 1306 and a display 1308.

The system 1300 may also include a secondary storage 1310. The secondary storage 1310 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1304, the secondary storage 1310, and/or any other memory, for that matter. Such computer programs, when executed, enable the system 1300 to perform various functions (as set forth above, for example). Memory 1304, storage 1310 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:

identifying, by a computer processor through a Network Function Virtualization Orchestrator (NFV-O) module of a NFV-based network, information corresponding to data traffic associated with the NFV-based network system, the NFV-O module being operable to manage data flow associated with one or more Virtual Network Functions (VNFs) existing in the NFV-based network system and one or more physical elements existing in the NFV-based network system;

determining, by the computer processor through the NFV-O module, an expected usage of the NFV-based network system based on the information corresponding to the data traffic;

determining, by the computer processor through the NFV-O module, that the expected usage of the NFV-based network system exceeds a capacity of existing components of the NFV-based network system;

when the computer processor determines that the expected usage of the NFV-based network system exceeds a capacity of existing components of the NFV-based network system, determining to implement in the NFV-based network system to handle the expected usage, by the computer processor through the NFV-O module, at least one of:
one or more new physical elements, and
one or more new VNFs;

determining, by the computer processor through the NFV-O module, a cost of implementing the one or more new physical elements in the NFV-based network system to handle the expected usage, a cost of implementing the one or more new VNFs in the NFV-based network system to handle the expected usage, and a cost of implementing a combination of the one or more new physical elements and the one or more new VNFs in the NFV-based network system to handle the expected usage; and selecting to implement in the NFV-based network system, by the computer processor through the NFV-O module based at least partially on the determined cost of implementing the one or more new physical elements, the cost of implementing the one or more new VNFs, and the cost of implementing the combination of the one or more new physical elements and the one or more new VNFs, at least one of:
the one or more new physical elements, and
the one or more new VNFs;

wherein the one or more new physical elements are selected to implement in the NFV-based network system when the cost of implementing the one or more new physical elements is less than the cost of implementing the one or more new VNFs;

wherein the one or more new VNFs are selected to implement in the NFV-based network system when the cost of implementing the one or more new VNFs is less than the cost of implementing the one or more new physical elements;

wherein the combination of the one or more new physical elements and the one or more new VNFs is selected to implement in the NFV-based network system when the cost of implementing the combination is less than the cost of implementing only the one or more new physical elements and is less than the cost of implementing only the one or more new VNFs.

2. The method of claim 1, further comprising monitoring data traffic associated with the NFV-based network system.

3. The method of claim 2, wherein monitoring the data traffic associated with the NFV-based network system functions to identify the information corresponding to data traffic.

4. The method of claim 1, further comprising generating a usage log utilizing the information corresponding to the data traffic.

5. The method of claim 4, wherein the usage log is utilized to determine the expected usage of the NFV-based network system.

6. The method of claim 1, wherein the cost of implementing the one or more new physical elements includes a cost to purchase the one or more new physical elements.

7. The method of claim 1, wherein the cost of implementing the one or more new physical elements includes at least one of a cost of electricity to utilize the one or more new physical elements, and a cost to install the one or more new physical elements.

8. The method of claim 1, wherein the cost of implementing the one or more new VNFs includes at least one of: a cost of usage of the one or more new VNFs; a cost of installing the one or more new VNFs; or a cost of renting the one or more new VNFs.

9. The method of claim 1, further comprising identifying a usage log to associate with the data traffic.

10. The method of claim 9, wherein determining the expected usage includes utilizing the usage log to determine the expected usage.

11. The method of claim 9, wherein the usage log of the NFV-based network system is estimated.

12. The method of claim 9, wherein determining the expected usage includes determining an expected average usage utilizing the usage log.

13. A computer program product embodied on a non-transitory computer readable medium, comprising:

computer code for identifying, by a computer processor through a Network Function Virtualization Orchestrator (NFV-O) module of a NFV-based network, information corresponding to data traffic associated with the NFV-based network system, the NFV-O module being operable to manage data flow associated with one or more Virtual Network Functions (VNFs) existing in the NFV-based network system and one or more physical elements existing in the NFV-based network system;

computer code for determining, by the computer processor through the NFV-O module, an expected usage of the NFV-based network system based on the information corresponding to the data traffic;

computer code for determining, by the computer processor through the NFV-O module, that the expected usage of the NFV-based network system exceeds a capacity of existing components of the NFV-based network system;

computer code for, when the computer processor determines that the expected usage of the NFV-based network system exceeds a capacity of existing components of the NFV-based network system, determining to implement in the NFV-based network system to handle the expected usage, by the computer processor through the NFV-O module, at least one of:
one or more new physical elements, and
one or more new VNFs;

computer code for determining, by the computer processor through the NFV-O module, a cost of implementing the one or more new physical elements in the NFV-based network system to handle the expected usage, a cost of implementing the one or more new VNFs in the NFV-based network system to handle the expected usage, and a cost of implementing a combination of the one or more new physical elements and the one or more new VNFs in the NFV-based network system to handle the expected usage; and computer code for selecting to implement in the NFV-based network system, by the computer processor through the NFV-O module based at least partially on the determined cost of implementing the one or more new physical elements, the cost of implementing the one or more new VNFs, and the cost of implementing the combination of the one or more new physical elements and the one or more new VNFs, at least one of:
  the one or more new physical elements, and
  the one or more new VNFs;

wherein the one or more new physical elements are selected to implement in the NFV-based network system when the cost of implementing the one or more new physical elements is less than the cost of implementing the one or more new VNFs;

wherein the one or more new VNFs are selected to implement in the NFV-based network system when the cost of implementing the one or more new VNFs is less than the cost of implementing the one or more new physical elements;

wherein the combination of the one or more new physical elements and the one or more new VNFs is selected to implement in the NFV-based network system when the cost of implementing the combination is less than the cost of implementing only the one or more new physical elements and is less than the cost of implementing only the one or more new VNFs.

14. A computer system comprising:

a memory system; and one or more processing cores coupled to the memory system and that are each configured to:

identify, through a Network Function Virtualization Orchestrator (NFV-O) module of a NFV-based network, information corresponding to data traffic associated with the NFV-based network system, the NFV-O module being operable to manage data flow associated with one or more Virtual Network Functions (VNFs) existing in the NFV-based network system and one or more physical elements existing in the NFV-based network system;

determine, through the NFV-O module, an expected usage of the NFV-based network system based on the information corresponding to the data traffic;

determine, through the NFV-O module, that the expected usage of the NFV-based network system exceeds a capacity of existing components of the NFV-based network system;

when the computer processor determines that the expected usage of the NFV-based network system exceeds a capacity of existing components of the NFV-based network system, determine to implement, in the NFV-based network system to handle the expected usage, through the NFV-O module, at least one of:
  one or more new physical elements, and
  one or more new VNFs;

determine, through the NFV-O module, a cost of implementing the one or more new physical elements in the NFV-based network system to handle the expected usage, a cost of implementing the one or more new VNFs in the NFV-based network system to handle the expected usage, and a cost of implementing a combination of the one or more new physical elements and the one or more new VNFs in the NFV-based network system to handle the expected usage; and select to implement in the NFV-based network system, through the NFV-O module based at least partially on the determined cost of implementing the one or more new physical elements, the cost of implementing the one or more new VNFs, and the cost of implementing the combination of the one or more new physical elements and the one or more new VNFs, at least one of:
  the one or more new physical elements, and
  the one or more new VNFs;

wherein the one or more new physical elements are selected to implement in the NFV-based network system when the cost of implementing the one or more new physical elements is less than the cost of implementing the one or more new VNFs;

wherein the one or more new VNFs are selected to implement in the NFV-based network system when the cost of implementing the one or more new VNFs is less than the cost of implementing the one or more new physical elements;

wherein the combination of the one or more new physical elements and the one or more new VNFs is selected to implement in the NFV-based network system when the cost of implementing the combination is less than the cost of implementing only the one or more new physical elements and is less than the cost of implementing only the one or more new VNFs.

* * * * *